(12) United States Patent
Gupta et al.

(10) Patent No.: US 10,650,029 B2
(45) Date of Patent: May 12, 2020

(54) SYSTEMS AND METHODS FOR ACCESSING CATEGORIZED CONTENT

(71) Applicant: Facebook, Inc., Menlo Park, CA (US)

(72) Inventors: Deepan Gupta, Sunnyvale, CA (US); Bogdan Andrei Chiritoiu, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 686 days.

(21) Appl. No.: 14/873,096

(22) Filed: Oct. 1, 2015

(65) Prior Publication Data

US 2017/0097978 A1  Apr. 6, 2017

(51) Int. Cl.
| | | |
|---|---|---|
| *G06F 16/00* | (2019.01) | |
| *G06F 16/28* | (2019.01) | |
| *G06F 3/0482* | (2013.01) | |
| *G06F 3/0484* | (2013.01) | |

(52) U.S. Cl.
CPC .......... *G06F 16/285* (2019.01); *G06F 3/0482* (2013.01); *G06F 3/04842* (2013.01)

(58) Field of Classification Search
CPC .......... G06F 17/30584; G06F 12/0848; G06F 17/30286; G06F 17/30321; G06F 17/30339; G06F 9/5061; G06F 16/24578; G06F 16/285; G06F 16/954; G06F 3/0482; G06F 3/04842; G06F 16/2428; G06F 16/248; G06F 16/90328; G06F 16/9535; Y10S 707/968; Y10S 707/972; H04L 51/32; H04L 12/1831; H04L 43/045; H04L 67/22

See application file for complete search history.

(56) References Cited

U.S. PATENT DOCUMENTS

| | | | |
|---|---|---|---|
| 8,352,386 B2 * | 1/2013 | Chitiveli | G06F 17/30707 706/12 |
| 9,117,250 B2 * | 8/2015 | Seth | H04W 4/21 |
| 9,397,974 B1 * | 7/2016 | Gross | H04L 51/32 |
| 9,424,612 B1 * | 8/2016 | Bright | G06Q 50/01 |
| 9,450,771 B2 * | 9/2016 | Browning | G06F 16/285 |
| 2009/0164416 A1 * | 6/2009 | Guha | G06F 16/31 |
| 2012/0278428 A1 * | 11/2012 | Harrison | H04N 21/2665 709/217 |
| 2013/0018957 A1 * | 1/2013 | Parnaby | G06Q 10/10 709/204 |
| 2015/0095329 A1 * | 4/2015 | Sanio | G06F 16/48 707/732 |
| 2017/0083599 A1 * | 3/2017 | Bostick | G06F 16/285 |

* cited by examiner

*Primary Examiner* — Merilyn P Nguyen
(74) *Attorney, Agent, or Firm* — Sheppard Mullin Richter & Hampton LLP

(57) ABSTRACT

Systems, methods, and non-transitory computer-readable media can determine that a content item corresponds to a category, the category including a plurality of other content items. A user selection of the category is received through a display interface. The content item is provided for presentation through the display interface. User feedback indicating whether the content item corresponds to the category is received. A determination is made whether to include the content item in the category based at least in part on the user feedback.

16 Claims, 8 Drawing Sheets

SYSTEMS AND METHODS FOR ACCESSING CATEGORIZED CONTENT

FIELD OF THE INVENTION

The present technology relates to the field of content retrieval. More particularly, the present technology relates to techniques for categorizing and accessing various types of content using computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content provider platform (e.g., a social networking system). Users can operate their computing devices to access the content items through the platform. Typically, the content items can be provided, or uploaded, by various entities including, for example, content publishers and also users of the content provider platform.

SUMMARY

Various embodiments of the present disclosure can include systems, methods, and non-transitory computer readable media configured to determine that a content item corresponds to a category, the category including a plurality of other content items. A user selection of the category is received through a display interface. The content item is provided for presentation through the display interface. User feedback indicating whether the content item corresponds to the category is received. A determination is made whether to include the content item in the category based at least in part on the user feedback.

In an embodiment, systems, methods, and non-transitory computer readable media are configured to determine that a threshold number of comments posted for the content item each include at least one term that corresponds to the category.

In an embodiment, systems, methods, and non-transitory computer readable media are configured to determine that the content item corresponds to the category based at least in part on a content publisher that originally posted the content item.

In an embodiment, systems, methods, and non-transitory computer readable media are configured to determine that the content item corresponds to the category based at least in part on a page or content feed through which the content item was posted.

In an embodiment, systems, methods, and non-transitory computer readable media are configured to determine that the user has performed a touch gesture indicating whether the content item corresponds to the category.

In an embodiment, systems, methods, and non-transitory computer readable media are configured to determine that the user has provided a voice command indicating whether the content item corresponds to the category.

In an embodiment, systems, methods, and non-transitory computer readable media are configured to determine that a threshold number of users have provided feedback indicating that the content item does not correspond to the category and to remove the first content item from the category.

In an embodiment, systems, methods, and non-transitory computer readable media are configured to determine that a ratio of i) a number of users that have provided feedback indicating that the content item corresponds to the category to ii) a number of users that have provided feedback indicating that the content item does not correspond to the category satisfies a threshold and to remove the first content item from the category.

In an embodiment, systems, methods, and non-transitory computer readable media are configured to determine a ranking for the content item in the category based at least in part on the user feedback, the ranking indicating an order in which the content item is presented among the other content items included in the category.

In an embodiment, systems, methods, and non-transitory computer readable media are configured to determine at least one sub-category of the category preferred by the user based at least in part on the user feedback and to adjust an order in which the other content items included in the category are presented to the user based at least in part on the at least one preferred sub-category.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
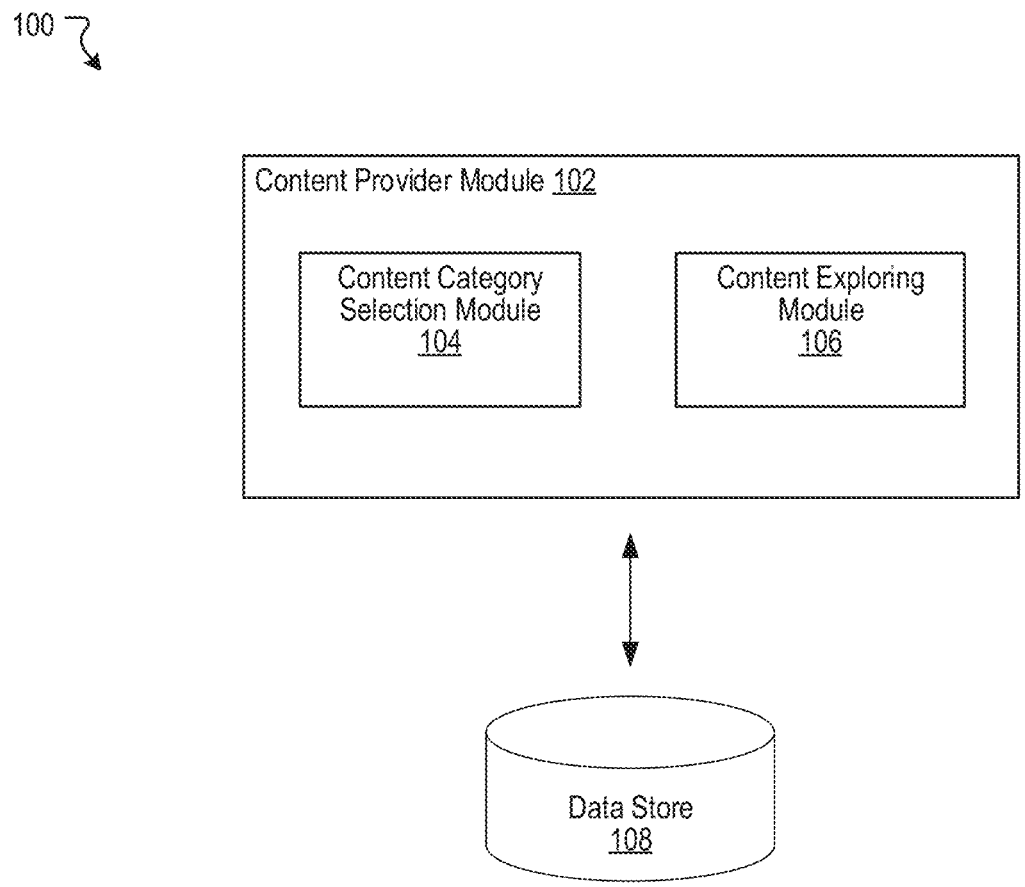
FIG. 1 illustrates an example system including an example content provider module configured to provide categorized content items for browsing, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Categorizing Content

People often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content provider platform (e.g., a social networking system). Users can operate their computing devices to access the content items through the platform. Typically, the content items can be provided, or uploaded, by various entities including, for example, content publishers and also users of the content provider platform. Under conventional approaches, content items can be categorized, for example, by entities that share the content items through the content provider platform. In some instances, curators can categorize and/or manage content items for various categories. Since content can be interpreted differently from entity to entity, such approaches, may not provide an optimal approach for categorizing content. For example, a content item that has been categorized in the fashion category may not be deemed as being related to fashion by a majority of users. In such instances, the content item would still be included in the fashion category despite such shortcomings until removed manually, for example, by a curator. Accordingly, such conventional approaches can provide for a sub-optimal experience for users browsing content items and may not be effective in addressing these and other problems arising in computer technology.

An improved approach rooted in computer technology overcomes the foregoing and other disadvantages associated with conventional approaches specifically arising in the realm of computer technology. In various embodiments, content items (e.g., images, videos, audio files, links, user status updates, articles, etc.) can be automatically categorized into various categories (e.g., a "funny" category, a "fashion" category, a "cute" category, etc.). Users operating computing devices can each access an interface that presents a list of the different categories of content items that are available for access. The user can select one of the categories to access, or view, content items that have been determined to correspond, or relate, to that category. In various embodiments, one content item from the selected category is presented to the user through the interface at a given time. The user can interact with the interface to "like" or "dislike" the content item being presented. For example, the user operating the computing device can perform a swipe gesture on the display screen of the computing device to indicate whether the user liked or disliked the content item. The feedback received from the user with respect to the content item can be utilized, for example, to rank the content item among the other content items that are included in that category. In some embodiments, a content item included in a category can be removed, or disassociated, from that category when the ratio, or number, of dislikes to likes satisfies a threshold. In one example, the threshold ratio can be 0.2, which means that there were two or more dislikes of a content item for every ten likes.

FIG. 1 illustrates an example system 100 including an example provider module 102 configured to provide content to users, according to an embodiment of the present disclosure. As shown in the example of FIG. 1, the content provider module 102 can include a category selection module 104 and a content exploring module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 710 of FIG. 7. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 730 of FIG. 7. It should be understood that there can be many variations or other possibilities.

In some embodiments, the content provider module 102 can be configured to communicate and/or operate with the at least one data store 108 in the example system 100. The at least one data store 108 can be configured to store and maintain various types of data. In various embodiments, the at least one data store 108 can store data relevant to function and operation of the content provider module 102. One example of such data is content items and the respective categories to which they are assigned and ranking scores for the content items within the different categories. In some implementations, the at least one data store 108 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

The content category selection module 104 can be configured to process user selections of content categories through a given interface. For example, in various embodiments, the user can access an interface that includes, or references, various content categories. In such embodiments, the user operating the computing device can interact with the interface to select a category. Each of the categories that are available for selection can be associated with one or more content items that have been determined to correspond, or relate, to the category.

In various embodiments, the content exploring module 106 can be configured to automatically determine such categorizations of content items. Once the user has selected a category, the content exploring module 106 can be configured to present, through the interface, content items that have been categorized in the selected category. In various embodiments, content items in the selected category are presented through the interface individually or one-at-a-time. The user can interact with the interface to provide feedback for the presented content item. In some instances, such feedback can be used to refine the ranking of the content item and/or the categorization of the content item. More details regarding the content exploring module 106 will be provided below in reference to FIG. 2.

Figure 2:
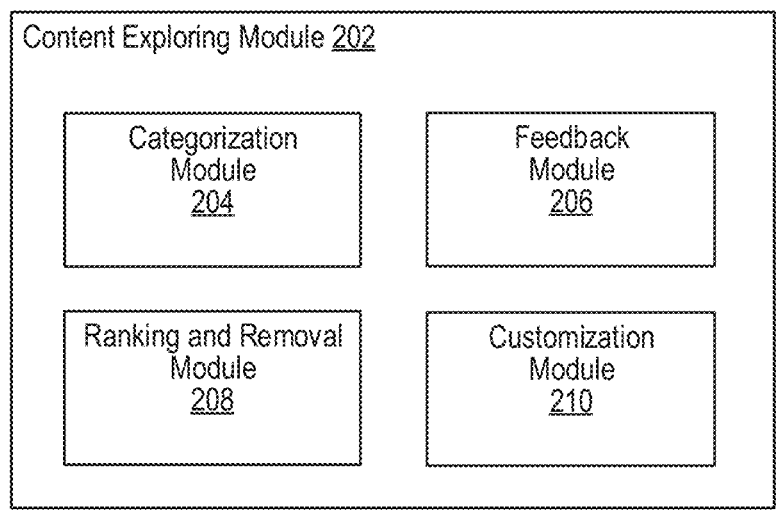
FIG. 2 illustrates an example content exploring module configured to categorize and provide categorized content items for browsing, according to an embodiment of the present disclosure.

FIG. 2 illustrates an example content exploring module 202 configured to categorize and provide categorized content items for browsing, according to an embodiment of the present disclosure. In some embodiments, the content exploring module 106 of FIG. 1 can be implemented with the content exploring module 202. As shown in the example of FIG. 2, the content exploring module 202 can include a categorization module 204, a feedback module 206, a ranking and removal module 208, and a customization module 210.

The categorization module 204 can be configured to automatically categorize content items into one or more categories. In some implementations, users of a social networking system can interact with content items, for example, by selecting a link in the content item, commenting on the content item, endorsing or "liking" the content item, "disliking" the content item, sharing the content item with other entities, to name some examples. In various embodiments, when categorizing a content item, the categorization module 204 can be configured to analyze the comments posted for the content item to determine an appropriate category for the content item. For example, when determining whether a content item corresponds to a given category, the categorization module 204 can analyze some, or all, of the comments posted in connection with the content item. When analyzing a comment, the categorization module 204 can determine whether the comment includes any terms, or keywords, that have been identified to correspond to a particular category. Moreover, when analyzing a comment, the categorization module 204 can apply any number of string matching techniques including, for example, converting the comment text to lowercase and allowing for imprecise string matching by permitting a threshold edit distance between terms. The categorization module 204 can keep a count of the total number of comments posted for the content item and the number of those comments that were determined to include terms that have been identified to correspond to a particular category.

For example, the categorization module 204 can determine that 1,000 total comments have been posted for a content item and, of those 1,000 comments, 800 comments include terms that were determined to correspond to a "fashion" category, 100 comments include terms were determined to correspond to a "funny" category, and 100 comments that included terms not corresponding to any category. In some embodiments, the categorization module 204 can determine the content item belongs in a first category based on a threshold ratio of the number of comments that included terms corresponding to the first category to the number of total comments for the content item. In one example, the threshold ratio can be 0.1, which means that, for the content item, there were one or more comments corresponding to the first category for every ten comments. In the example above, the categorization module 204 can determine that the ratio of 800 fashion-related comments to the 1,000 total comments for the content item satisfies the threshold ratio and, therefore, categorize the content item as being in the fashion category. In some embodiments, rather than relying on a threshold ratio, the categorization module 204 can categorize the content item when the number of comments that include terms corresponding to a category satisfy a threshold value. Thus, in the example above, the categorization module 204 can determine that the number of fashion-related comments posted for the content item (800 comments) satisfy a threshold for categorizing the content item in the fashion category. Content items may be categorized in just one category or multiple categories, depending on the implementation. Depending on the implementation, when analyzing comments posted for a content item, the categorization module 204 can ignore or also consider any downstream comments posted for the content item. Such downstream comments can result when the content item is shared by a user through the social networking system and other users of the social networking system comment on the shared post instead of the originally posted content item or when other users post comments in reply to a comment posted by the user.

In one example, when determining whether to categorize a content item in the funny (e.g., humor) category, the categorization module 204 can analyze each of (or a portion of) the comments posted for the content item to determine whether the comments include any terms or keywords indicative of the content item being funny. Some example terms indicative of a content item being funny include "LOL", "ROFL", "haha", "funny", "joke", etc. When analyzing comments, the categorization module 204 can also consider relevant terms or keywords in different languages. For example, users that speak the Spanish language may use a different set of terms to express a funny or humorous reaction, such as "jeje". As mentioned, in some embodiments, the categorization module 204 can analyze a comment by determining whether any terms indicative of a content item being funny are included in the comment. Thus, for a comment that includes "haha very funny", the categorization module 204 can determine that the comment includes one or more terms indicative of the content item being funny. The categorization module 204 can then determine whether a ratio of the number, or count, of comments that were determined to indicate the content item corresponds to the funny category to the total number of comments posted for the content item satisfies a threshold. If such threshold is satisfied, the categorization module 204 can categorize the content item in the funny category.

In some embodiments, the categorization module 204 can categorize a content item in one or more categories based on the content publisher that originally posted the content item and/or a page or content feed through which the content item was shared or posted. For example, content items posted by a content publisher that is known to be affiliated with the fashion industry can be determined to correspond to the fashion category. In another example, content items posted through a page or content feed that is affiliated with the fashion industry can also be determined to correspond to the fashion category. In some embodiments, when categorizing content items based on the content publisher and/or the page or content feed, the categorization module 204 can additionally determine that the content item being categorized is a popular content item. The popularity of a content item can be measured, for example, based at least in part on the number of "likes", the number of comments received for the content item, and/or the number of times the content item has been shared by users.

As mentioned, users can access categorized content items through an interface. For example, a user operating a computing device can access an interface provided by the content exploring module 202. The interface can present a list of the different categories of content items that are available for access. The user operating the computing device can interact with the interface to access, or view, content items that have been determined to correspond a selected category. In various embodiments, the content exploring module 202 provides, through the interface, one content item from the selected category to be presented on the display screen of the computing device at a given time.

While the content item is being presented, the feedback module 206 can capture any feedback provided by the user with respect to the content item. For example, the user can interact with the interface to "like" or "dislike" the content item being presented. In some embodiments, the user operating the computing device can provide feedback by performing a swipe gesture on the display screen of the computing device to indicate whether the user liked or disliked the content item. For example, a swipe gesture toward the top of the display screen can correspond to a "like" while a swipe gesture toward the bottom of the display screen can correspond to a "dislike". Various types of gestures and/or directions of gestures can be used to provide the feedback and such configurations can vary depending on the implementation. Other ways of providing feedback are possible. For example, in some embodiments, a user can provide voice feedback by simply saying the appropriate words (e.g., "like" or "dislike", "funny" or "not funny", etc.) through a microphone in, or connected to, the computing devices being operated by the user.

The "like" and "dislike" options described above are provided as one example of the type of feedback that a user can provide with respect to a content item. In some embodiments, such options can be used to indicate whether a content item does or does not correspond to a particular category. For example, for content items that are categorized in the funny category, a user can interact with the interface to indicate whether the content item is "funny" or "not funny". Similarly, for content items that are categorized in the "cute" category, a user can interact with the interface to indicate whether the content item is "cute" or "not cute". Further, the categories described herein are provided merely as examples and there may be any number of different categories or sub-categories depending on the implementation. Moreover, the feedback elicited from users with respect to content items need not be limited to whether a content item does or does not correspond to a particular category. Rather, the feedback elicited may ask users to determine whether the content item does or does not correspond to any sub-categories. For example, a content item may be categorized in the "funny" category and also in the "satire" sub-category. In this example, users may be asked to provide feedback indicating whether the content item does or does not correspond to the "satire" sub-category. Such feedback may be utilized to further refine the categorization and/or ranking of content items within sub-categories.

In some embodiments, the ranking and removal module 208 can be configured to rank content items in a category based on the feedback received from users. In some embodiments, the ranking and removal module 208 can rank a content item in a category based on the number of users that provided feedback indicating that the content item corresponds to that category. In such embodiments, the content items in the category can be ranked in descending order based on the respective number of users that provided feedback indicating that the content item corresponds to that category. Thus, for example, the funny category may include a first content item, a second content item, and a third content item. In this example, if 200 users have indicated that the first content item corresponds to the funny category, 100 users have indicated that the second content item corresponds to the funny category, and 300 users have indicated that the third content item corresponds to the funny category, then the content items can be ranked in the funny category as follows: third content item, first content item, and second content item. In some embodiments, the ranking and removal module 208 can rank a content item in a category based on a ratio of i) the number of users that indicated that the content item corresponds to the category and ii) the number of users that indicated that the content item does not correspond to the category.

In some embodiments, the ranking and removal module 208 can remove, or disassociate, a content item from a category when the ratio, or number, of dislikes to likes satisfies a threshold. For example, if a threshold number of users provide feedback indicating that a content item does not correspond to a category, then the ranking and removal module 208 can remove the content item from the category. In another example, if a ratio of the number of users indicating that a content item corresponds to a category and the number of users indicating that the content item does not correspond to the category satisfies a threshold, then the ranking and removal module 208 can remove the content item from the category.

In various embodiments, the customization module 210 can be configured to utilize user feedback to customize the content items that are provided to the user through a given category. For example, the customization module 210 can be configured to determine, based on user feedback, that the user prefers to view content items that have been categorized in certain sub-categories. In various embodiments, the content items provided to the user for a given category, or the ranking of content items in the given category, can be adjusted based on the user preference. In one example, content items categorized in the funny category may be associated with various sub-categories, such as "meme", "satire", and "video". While browsing the content items, the user can provide feedback indicating whether a content item was "funny" or "not funny". The customization module 210 can determine, based on such user feedback, whether the user has a preference for content items corresponding to the meme, satire, and/or video sub-categories. For example, if the user feedback indicated that content items in the satire sub-category are funny and content items in the meme and video sub-categories are not funny, then the customization module 210 can adjust the number of content items provided to the user from the different sub-categories accordingly and/or adjust the ranking of content items provided from the different sub-categories so that content items in the satire sub-category are ranked higher than those in the meme or video sub-categories.

In some embodiments, user feedback received from a first user can be used to determine content item category and/or sub-category preferences for a second user. In such embodiments, such preferences can be applied when the second user is determined to satisfy a threshold level of similarity to the first user. Similarity between two users can be determined in various ways including, for example, the two users sharing a geographic location (e.g., zip code, city, state, country, etc.), the two users sharing social and/or demographic details, and/or the two users demonstrating similarity based on their interactions with content items (e.g., the users "like", comment on, and/or share the same, or similar, content items).

Figure 3:
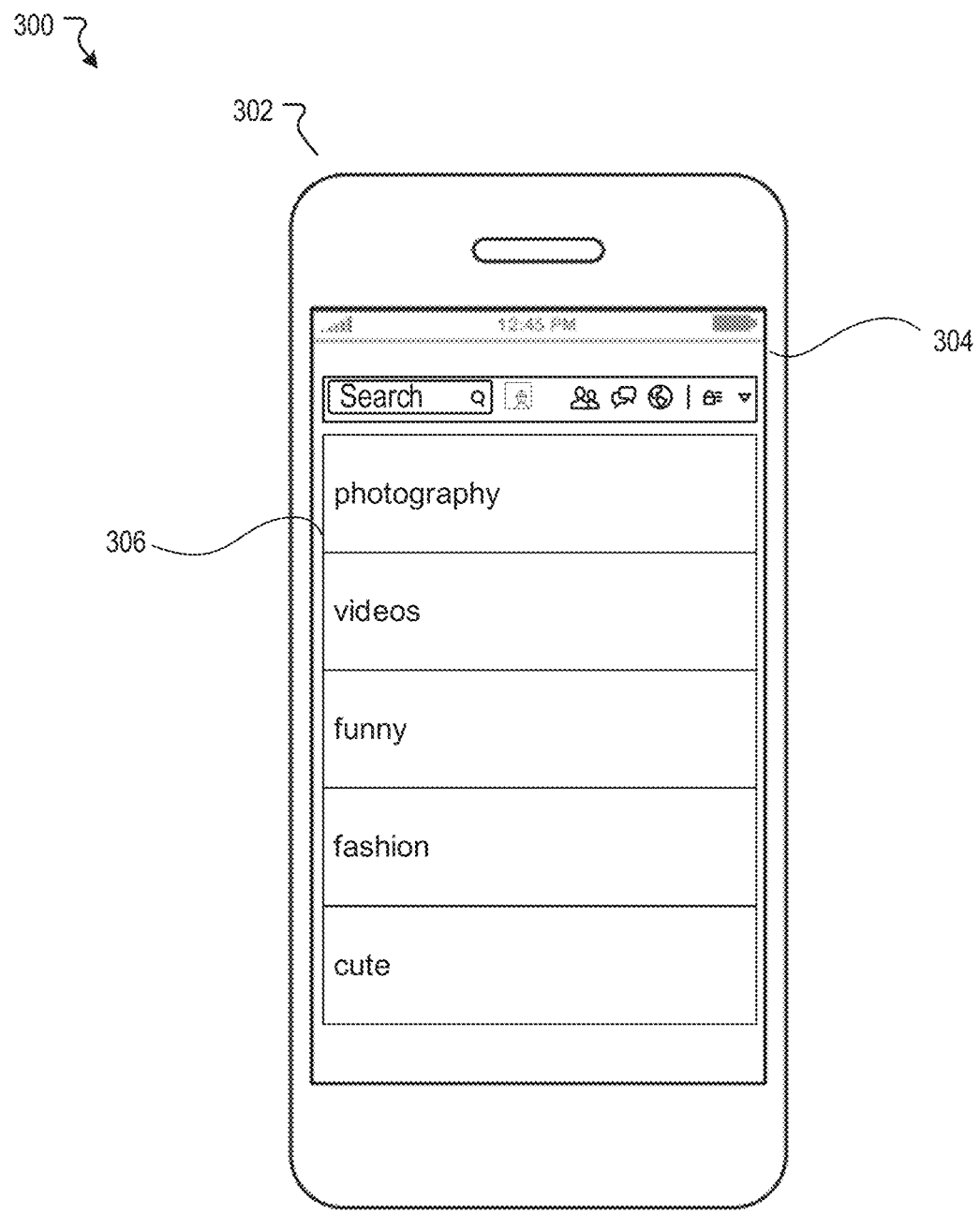
FIG. 3 illustrates an example of an interface for accessing categorized content items, according to an embodiment of the present disclosure.

FIG. 3 illustrates an example 300 of an interface 304 of a computing device 302 for accessing categorized content items, according to an embodiment of the present disclosure. In this example, the interface 304 is presented on a display screen of the computing device 302. Further, the interface 304 may be provided through an application (e.g., a social networking application) running on the computing device 302. The user operating the computing device 302 can select, through the interface 304, a category 306 to access content items that have been categorized in that category. In various embodiments, the categories listed in the interface 304 can be customized for a user. For example, if a determination is made that the user prefers to view sports-related content items but not fashion-related content items, then the interface 304 can be customized to replace the fashion category with a sports category. Upon selecting a category, content items associated with the selected category can be presented through the interface 304, as described in reference to FIG. 4.

Figure 4:
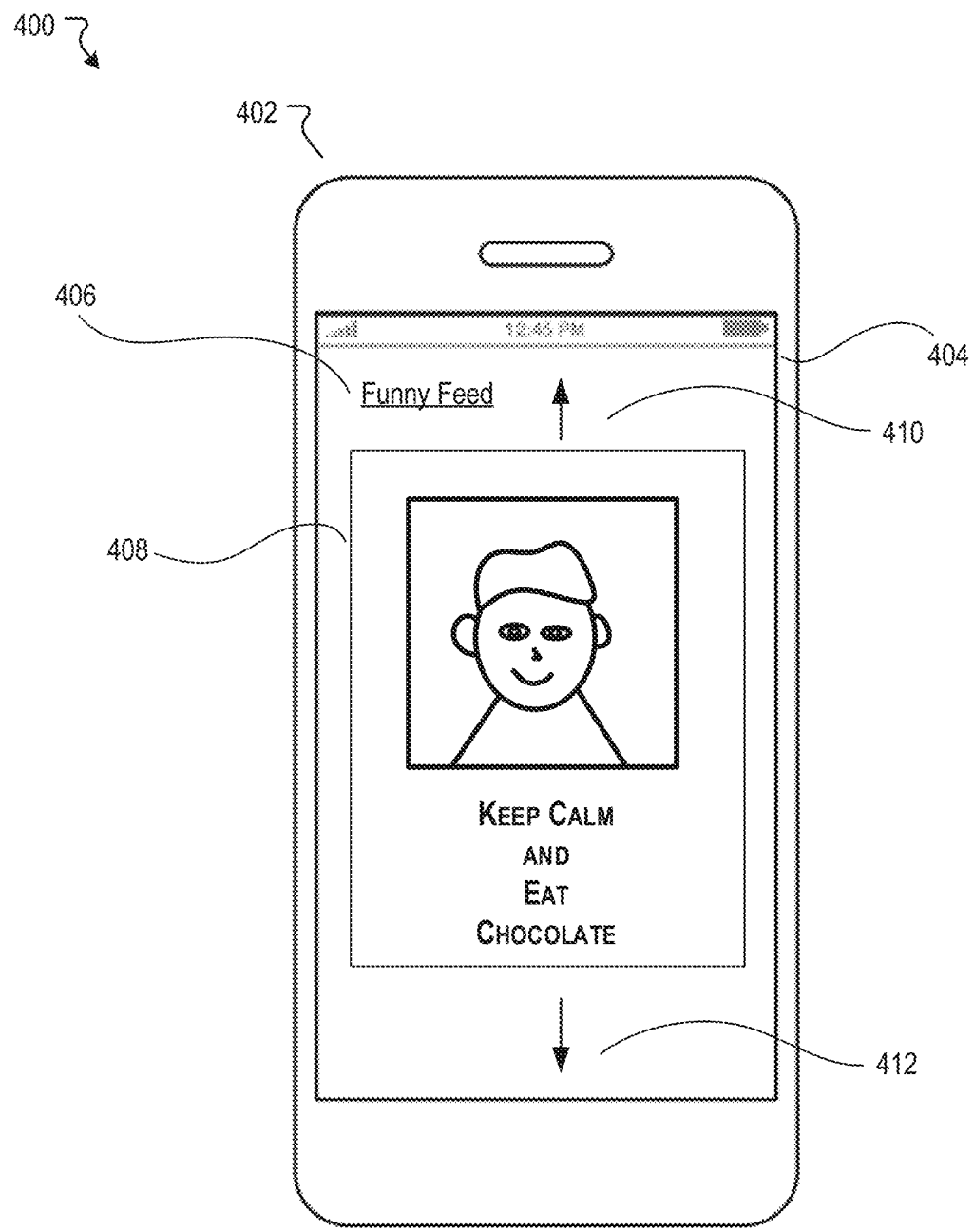
FIG. 4 illustrates an example of an interface for exploring categorized content items, according to various embodiments of the present disclosure.

FIG. 4 illustrates an example 400 of an interface 404 of a computing device 402 for exploring categorized content items, according to various embodiments of the present disclosure. In this example, the interface 404 is presented on a display screen of the computing device 402. Further, the interface 404 may be provided through an application (e.g., a social networking application) running on the computing device 402. In the example of FIG. 4, the user operating the computing device 402 has selected a funny category 406 to access content items in that category. As a result, the interface 404 is illustrated as presenting a content item 408 that is associated with the funny category 406. As mentioned, in various embodiments, users can provide feedback with respect to the content items being presented. In the example of FIG. 4, the user operating the computing device 402 can provide feedback by performing a swipe gesture on the display screen of the computing device 402. For example, the user can perform an upward swipe gesture 410 to indicate that the user found the content item 408 to be funny or a downward swipe gesture 412 to indicate that the user found the content item 408 to not be funny. Such user feedback can be used, for example, to rank the content item 408 among other content items in the funny category and/or to determine whether the content item 408 should even be included in the funny category 406, as described above. In some embodiments, the interface 404 is configured to present non-repetitive content. That is, a content item is not shown to a user through the interface 404 once the user has viewed the content item and/or provided feedback for the content item. In such embodiments, the user can exit the interface 404 at any time and then launch the interface 404 again at a later time to resume viewing new, or unseen, content items. In some embodiments, the user can select the content item 408, for example, by performing a tap gesture, to further interact with the content item 408, as described in reference to FIG. 5.

Figure 5:
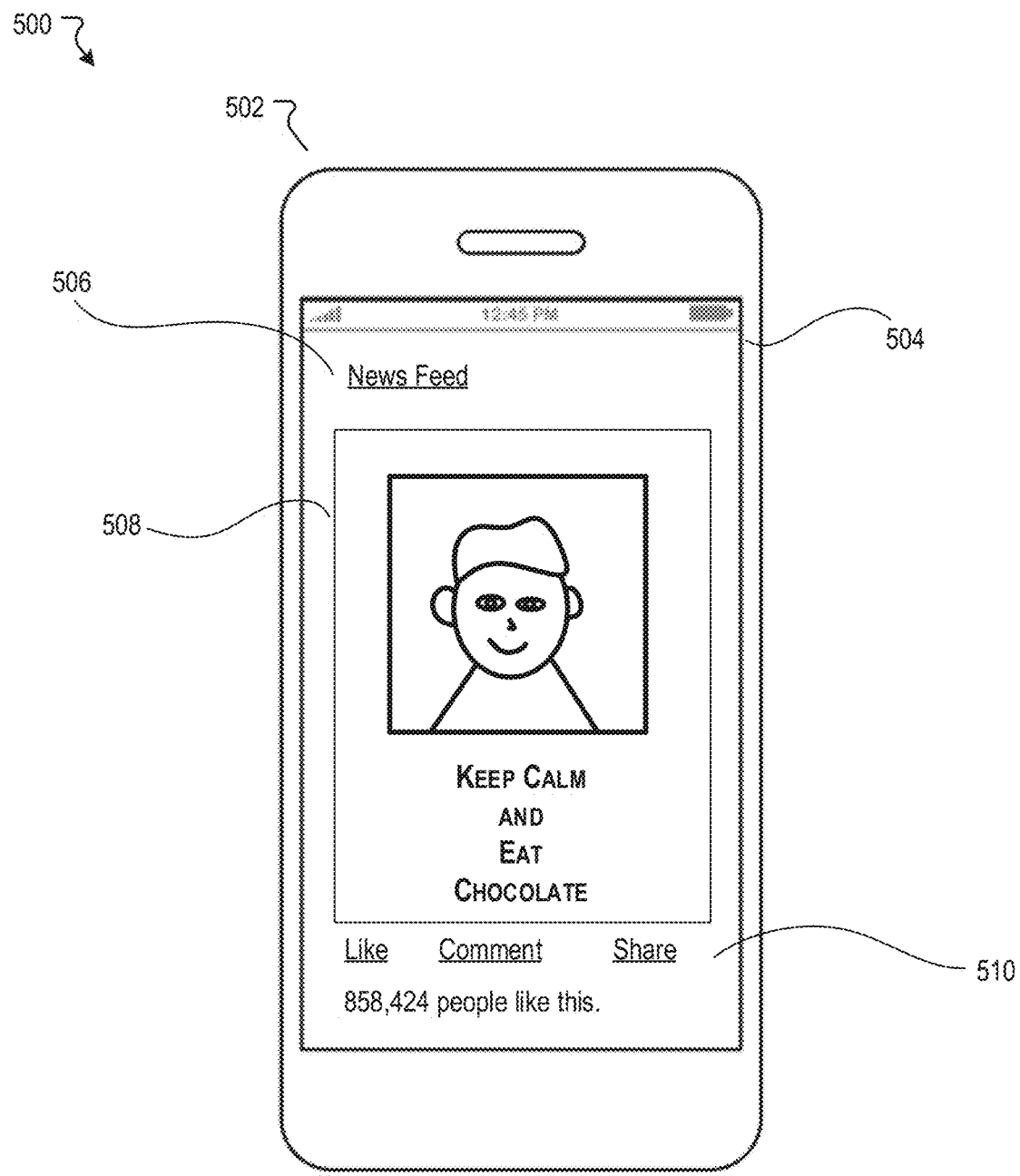
FIG. 5 illustrates an example of an interface for interacting with a content item, according to various embodiments of the present disclosure.

FIG. 5 illustrates an example 500 of an interface 504 of a computing device 502 for interacting with a content item 508, according to various embodiments of the present disclosure. In this example, the interface 504 is presented on a display screen of the computing device 502. Further, the interface 504 may be provided through an application (e.g., a social networking application) running on the computing device 502. In the example of FIG. 5, the user operating the computing device 502 has selected the content item 508 to further interact with the content item 508. In some embodiments, upon selecting the content item 508, the interface 504 can present the content item 508 in the content feed 506 through which it was originally posted. The user can interact 510 with the content item 508 through the interface, for example, to like or dislike the content item 508, add a comment with respect to the content item 508, and/or to share the content item 508 with other users.

Figure 6:
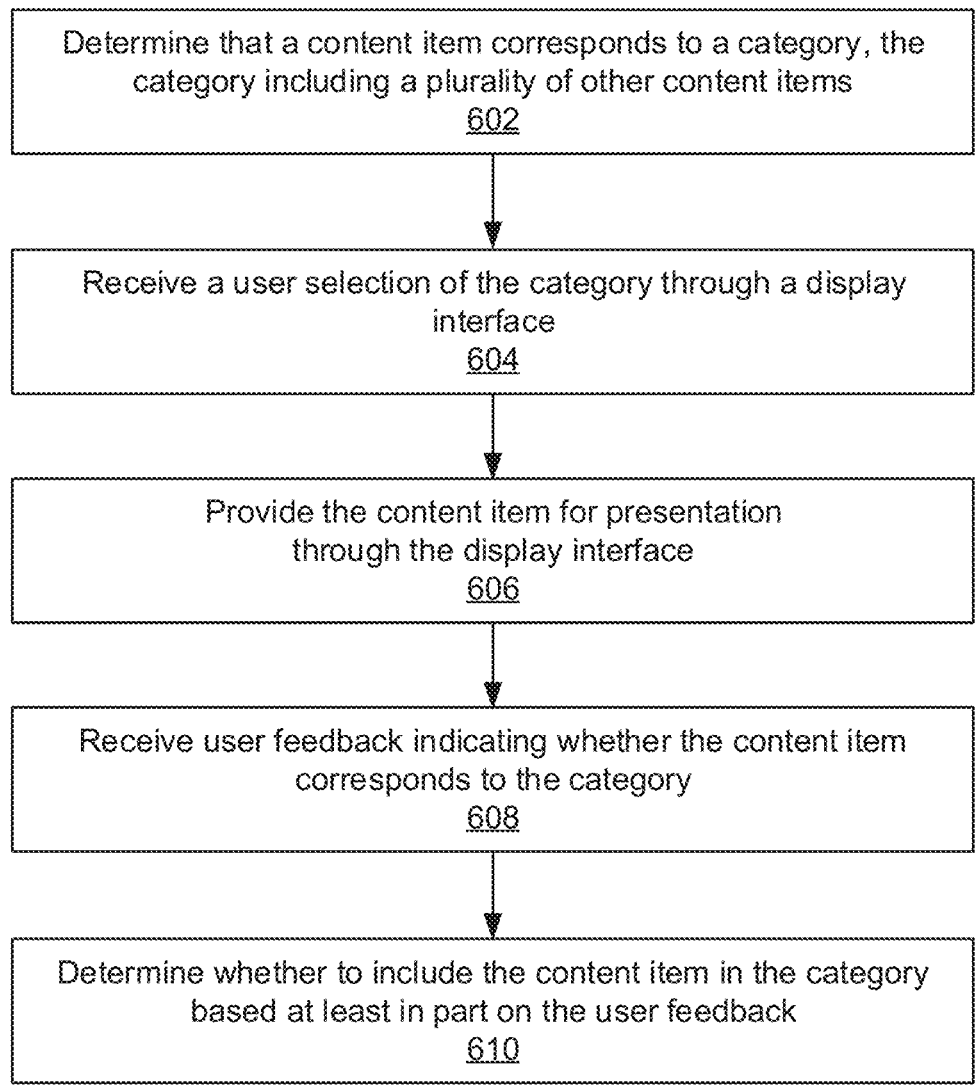
FIG. 6 illustrates an example method for exploring categorized content items, according to an embodiment of the present disclosure.

FIG. 6 illustrates an example method for exploring categorized content items, according to an embodiment of the present disclosure. It should be appreciated that there can be additional, fewer, or alternative steps performed in similar or alternative orders, or in parallel, within the scope of the various embodiments discussed herein unless otherwise stated. At block 602, the example method 600 can determine that a content item corresponds to a category, the category including a plurality of other content items. At block 604, a user selection of the category can be received through a display interface. At block 606, the content item is provided for presentation through the display interface. At block 608, user feedback indicating whether the content item corresponds to the category is received. At block 610, a determination is made whether to include the content item in the category based at least in part on the user feedback.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
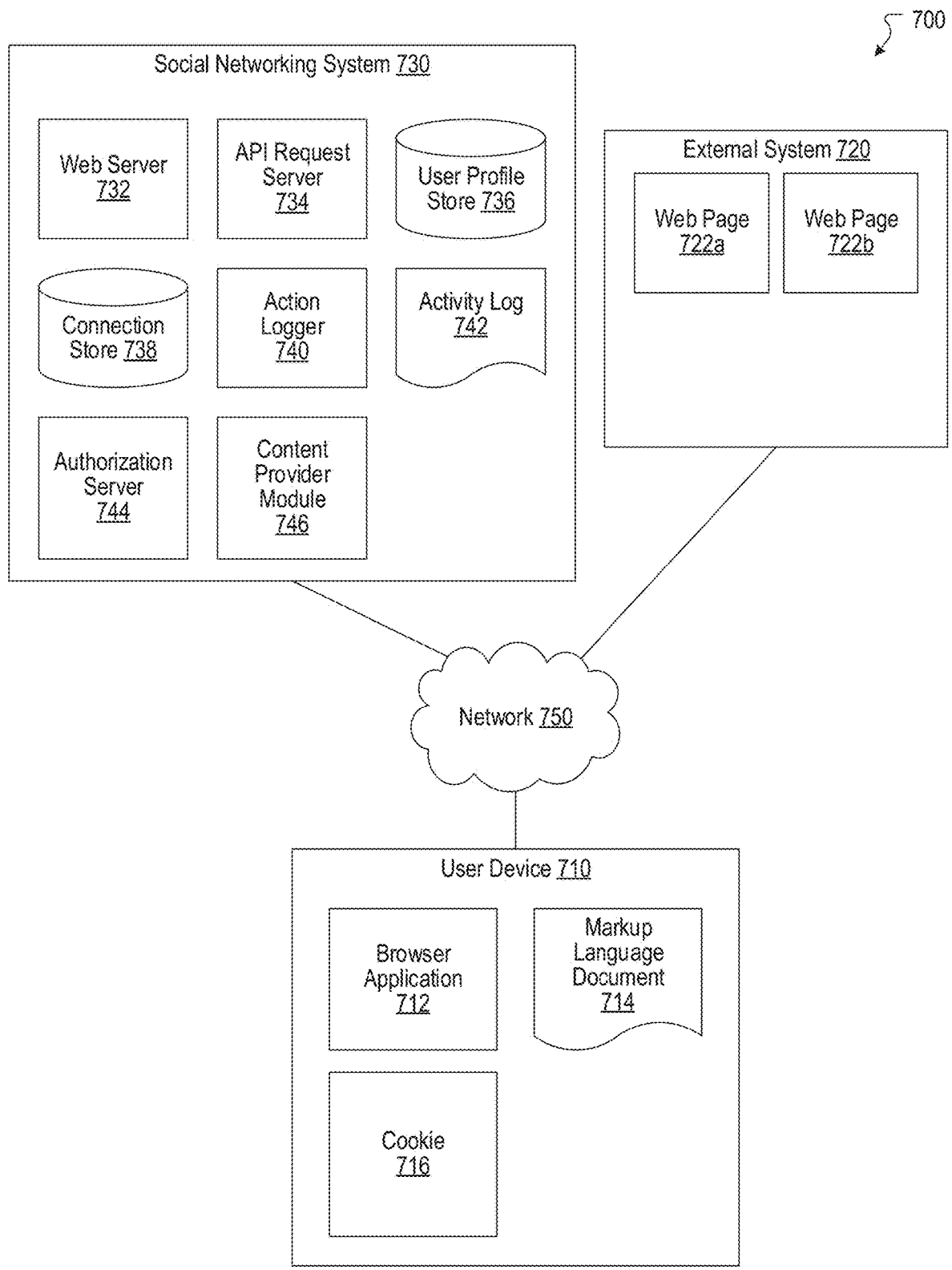
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content provider module 746. The content provider module 746 can, for example, be implemented as the content provider module 102 of FIG. 1. As discussed previously, it should be appreciated that there can be many variations or other possibilities.

Hardware Implementation

Figure 8:
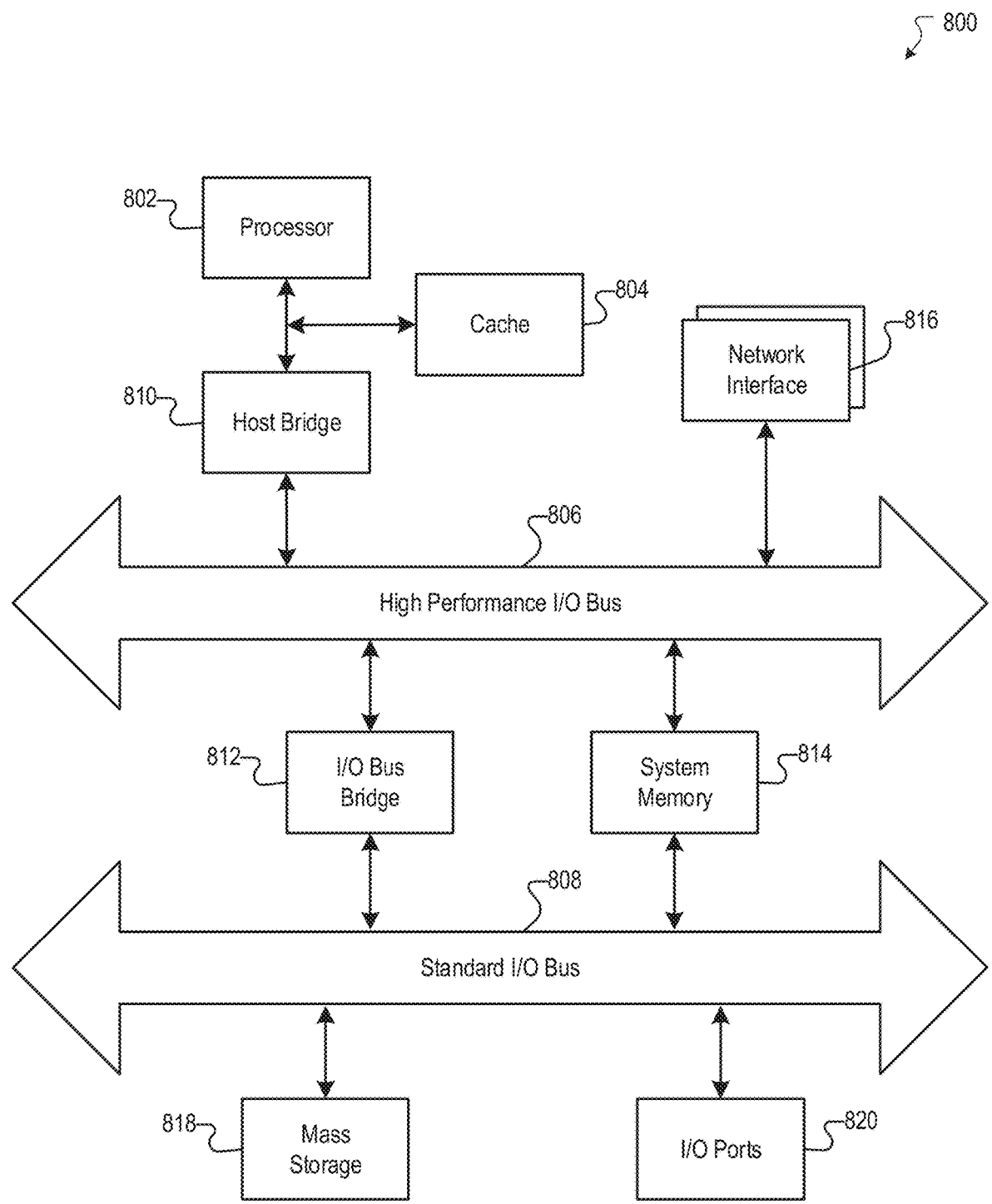
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing device, that a content item corresponds to a category, the category including a plurality of other content items, the determining further comprising:
      determining, by the computing device, that a threshold number of comments posted for the content item each include at least one pre-defined term that is associated with the category;
   receiving, by the computing device, a user selection of the category through a display interface;
   providing, by the computing device, the content item for presentation through the display interface;
   receiving, by the computing device, user feedback indicating whether the content item corresponds to the category; and
   determining, by the computing device, whether to include the content item in the category based at least in part on the user feedback, the determining further comprising:
      determining, by the computing device, that a threshold number of users have provided feedback indicating that the content item does not correspond to the category; and
      removing, by the computing device, the first content item from the category.

2. The computer-implemented method of claim 1, wherein determining, by the computing device, that the content item corresponds to the category further comprises:

determining, by the computing device, that the content item corresponds to the category based at least in part on a content publisher that originally posted the content item.

3. The computer-implemented method of claim 1, wherein determining, by the computing device, that the content item corresponds to the category further comprises:
   determining, by the computing device, that the content item corresponds to the category based at least in part on a page or content feed through which the content item was posted.

4. The computer-implemented method of claim 1, wherein receiving, by the computing device, user feedback indicating whether the content item corresponds to the category further comprises:
   determining, by the computing device, that the user has performed a touch gesture indicating whether the content item corresponds to the category.

5. The computer-implemented method of claim 1, wherein receiving, by the computing device, user feedback indicating whether the content item corresponds to the category further comprises:
   determining, by the computing device, that the user has provided a voice command indicating whether the content item corresponds to the category.

6. The computer-implemented method of claim 1, wherein determining, by the computing device, whether to include the content item in the category based at least in part on the user feedback further comprises:
   determining, by the computing device, that a ratio of i) a number of users that have provided feedback indicating that the content item corresponds to the category to ii) a number of users that have provided feedback indicating that the content item does not correspond to the category satisfies a threshold; and
   removing, by the computing device, the first content item from the category.

7. The computer-implemented method of claim 1, the method further comprising:
   determining, by the computing device, a ranking for the content item in the category based at least in part on the user feedback, the ranking indicating an order in which the content item is presented among the other content items included in the category.

8. The computer-implemented method of claim 1, the method further comprising:
   determining, by the computing device, at least one sub-category of the category preferred by the user based at least in part on the user feedback; and
   adjusting, by the computing device, an order in which the other content items included in the category are presented to the user based at least in part on the at least one preferred sub-category.

9. A system comprising:
   at least one processor; and
   a memory storing instructions that, when executed by the at least one processor, cause the system to perform:
      determining that a content item corresponds to a category, the category including a plurality of other content items, the determining further comprising:
         determining that a threshold number of comments posted for the content item each include at least one pre-defined term that is associated with the category;
      receiving a user selection of the category through a display interface;
      providing the content item for presentation through the display interface;
      receiving user feedback indicating whether the content item corresponds to the category; and
      determining whether to include the content item in the category based at least in part on the user feedback, the determining further comprising:
         determining that a threshold number of users have provided feedback indicating that the content item does not correspond to the category; and
         removing the first content item from the category.

10. The system of claim 9, wherein determining that the content item corresponds to the category further causes the system to perform:
   determining that the content item corresponds to the category based at least in part on a content publisher that originally posted the content item.

11. The system of claim 9, wherein determining that the content item corresponds to the category further causes the system to perform:
   determining that the content item corresponds to the category based at least in part on a page or content feed through which the content item was posted.

12. The system of claim 9, wherein receiving user feedback indicating whether the content item corresponds to the category further causes the system to perform:
   determining that the user has performed a touch gesture indicating whether the content item corresponds to the category.

13. A non-transitory computer-readable storage medium including instructions that, when executed by at least one processor of a computing system, cause the computing system to perform a method comprising:
   determining that a content item corresponds to a category, the category including a plurality of other content items, the determining further comprising:
      determining that a threshold number of comments posted for the content item each include at least one pre-defined term that is associated with the category;
   receiving a user selection of the category through a display interface;
   providing the content item for presentation through the display interface;
   receiving user feedback indicating whether the content item corresponds to the category; and
   determining whether to include the content item in the category based at least in part on the user feedback, the determining further comprising:
      determining that a threshold number of users have provided feedback indicating that the content item does not correspond to the category; and
      removing the first content item from the category.

14. The non-transitory computer-readable storage medium of claim 13, wherein determining that the content item corresponds to the category further causes the computing system to perform:
   determining that the content item corresponds to the category based at least in part on a content publisher that originally posted the content item.

15. The non-transitory computer-readable storage medium of claim 13, wherein determining that the content item corresponds to the category further causes the computing system to perform:
   determining that the content item corresponds to the category based at least in part on a page or content feed through which the content item was posted.

16. The non-transitory computer-readable storage medium of claim 13, wherein receiving user feedback indicating whether the content item corresponds to the category further causes the computing system to perform:
    determining that the user has performed a touch gesture indicating whether the content item corresponds to the category.

\* \* \* \* \*